US005565057A

United States Patent [19]

Owens

[11] Patent Number: 5,565,057

[45] Date of Patent: Oct. 15, 1996

[54] WEB FEED CONVEYOR ASSEMBLY IN A WOODEN I-BEAM ASSEMBLY MACHINE AND WEB FEEDING METHOD

[75] Inventor: William M. Owens, Tacoma, Wash.

[73] Assignee: Globe Machine Manufacturing Company, Tacoma, Wash.

[21] Appl. No.: 396,161

[22] Filed: Feb. 28, 1995

Related U.S. Application Data

[63] Continuation-in-part of Ser. No. 147,526, Nov. 5, 1993, Pat. No. 5,501,752.

[51] Int. Cl.[6] .......... B32B 31/00

[52] U.S. Cl. .......... 156/304.1; 156/559; 156/566; 156/569; 198/463.4; 271/93

[58] Field of Search .......... 156/304.1, 304.5, 156/556, 559, 560, 566, 569; 198/463.2, 463.4; 144/245 A, 245 E; 271/11, 12, 90, 93

[56] References Cited

U.S. PATENT DOCUMENTS

| | | | |
|---|---|---|---|
| 1,150,302 | 8/1915 | Perkins et al. | 198/463.4 |
| 1,631,150 | 6/1927 | Owen | 198/481.1 |
| 2,941,655 | 6/1960 | Wells | 198/408 |
| 3,039,588 | 6/1962 | Harnack | 198/463.4 |
| 3,092,513 | 6/1963 | Browning | 118/212 |
| 3,194,380 | 7/1965 | Watson | 156/499 |
| 3,209,890 | 10/1965 | Miles | 198/463.4 |
| 3,367,478 | 2/1968 | Brookhyser | 156/364 X |
| 3,490,188 | 1/1970 | Troutner | 52/644 |
| 3,494,455 | 2/1970 | Sarring | 198/408 |
| 3,616,091 | 10/1971 | Troutner | 156/560 |
| 3,894,908 | 7/1975 | Troutner et al. | 156/258 |
| 3,917,503 | 11/1975 | Tamura et al. | 156/499 |
| 4,074,498 | 2/1978 | Keller et al. | 52/690 |
| 4,123,315 | 10/1978 | Keller et al. | 156/559 |
| 4,191,000 | 3/1980 | Henderson | 52/729 |
| 4,195,462 | 4/1980 | Keller et al. | 52/690 |
| 4,243,465 | 1/1981 | Gozzi | 156/363 X |
| 4,249,355 | 2/1981 | Anderson et al. | 52/593 |
| 4,336,678 | 6/1982 | Peters | 52/729 |
| 4,356,045 | 10/1982 | Elford et al. | 156/64 |
| 4,413,459 | 11/1983 | Lambuth | 52/729 |
| 4,456,497 | 6/1984 | Eberle | 156/257 |
| 4,458,465 | 7/1984 | Coe | 156/729 |
| 4,519,492 | 5/1985 | Focke | 198/408 |
| 4,601,384 | 7/1986 | Van Doren | 198/481.1 |
| 4,665,306 | 5/1987 | Roland et al. | 425/174.4 |
| 4,797,169 | 1/1989 | Aizawa et al. | 156/363 X |
| 4,846,923 | 7/1989 | Lines | 156/566 |
| 4,869,360 | 9/1989 | Brown et al. | 198/463.4 |
| 4,945,976 | 8/1990 | Ritola | 198/463.4 |
| 5,080,154 | 1/1992 | Kallesoe | 144/352 |
| 5,080,339 | 1/1992 | Hirahara | 270/21.1 |

*Primary Examiner*—David A. Simmons
*Assistant Examiner*—Paul M. Rivard
*Attorney, Agent, or Firm*—Lowe, Price, LeBlanc & Becker

[57] ABSTRACT

In a production line for manufacturing wooden I-beams in a chords and webs assembly machine, a vacuum belt conveyor system is provided to sequentially feed bottom web members from beneath a web stack into a web run-up and drive system associated with the machine. The vacuum belt conveyor system features a vacuum supply box mounted between the web support rails through a series of vertical screw adjustment assemblies permitting adjustment of the inclination of the conveyor belt relative to the head drive pulley. A system of vacuum supply holes in the top plate of the vacuum box is utilized to apply a greater amount of vacuum to the leading end of the webs than the trailing end to minimize belt wear.

14 Claims, 3 Drawing Sheets

WEB FEED CONVEYOR ASSEMBLY IN A WOODEN I-BEAM ASSEMBLY MACHINE AND WEB FEEDING METHOD

RELATED APPLICATIONS

The present application is a continuation-in-part of application Ser. No. 08/147,526 filed Nov. 5, 1993, now U.S. Pat. No. 5,501,752, entitled "Wooden I-Beam Assembly Machine and Control System Therefor" assigned to Globe Machine Manufacturing Company, Tacoma, Washington, the assignee of the present invention.

BACKGROUND ART

The present invention relates to improved apparatus for making a wooden I-beam apparatus and method of making a wooden I-beam from a pair of wood flanges and web members interconnecting the flanges and, more particularly, to improvements in the web conveyor assembly for feeding a bottom web member in a web hopper stack into the assembly machine.

DISCLOSURE OF THE INVENTION

In my aforementioned co-pending '526 application, there is disclosed a wooden I-beam assembly machine for use in a production line for manufacturing wooden I-beams wherein a pair of grooved flanges are conveyed along opposite left and right sides of a train of wooden web members and converged so that the web longitudinal edges are inserted into the flange grooves. The flanges are moved along left and right hand chutes of the assembly machine with plural vertical flange drive rolls engaging the wider flange faces for improved traction. These flange drive rolls and the chutes are mounted to a machine base with a lateral adjustment mechanism permitting center justified adjusting movement relative to the machine center line. The lateral adjustment mechanism utilizes a series of lead screws each formed with left and right handed threaded portions engageable with a threaded nut attached to each chute. A pair of web bottom support rails are adjustable in elevation with plural vertical column screws connected between the machine base and the support rails. Each of the infeed and outfeed flange drive rolls, and the web drive rolls, are preferably operated with hydraulic motors which are interconnected through microprocessor control so as to be monitored and adjusted during production run to achieve substantially constant output speeds with predictable and repeatable drive roll speeds and tension forces.

In FIG. 14 of my aforementioned co-pending '526 application, there is disclosed a web hopper feeder gate against which a stack of webs are maintained within the web hopper to allow for controlled sequential feeding of a bottommost web in the stack utilizing a lugged web feeder chain assembly depicted in FIGS. 15 and 16 of the '526 application. The lugged chain assembly is mounted between the web support rails upstream from the web feeder gate and is essentially comprised of a head sprocket rotatable about a laterally directed, horizontal axis and directly connected to a hydraulic motor mounted to the left hand one of the web bottom support rails. The upstream end of the chain feed assembly is defined by a small diameter tail sprocket mounted to and between the web bottoms support rails. A lugged chain assembly is trained around both the head drive and tail sprocket and carries a pair of lugs having a web engaging face protruding upwardly from the upper edges of the bottom support rails when each lug travels in the downstream direction of web conveyance along the upper run of the chain feed assembly.

In the preferred embodiment, the lugs are spaced from each other and controlled so that the lugged web feed chain system can accept eight feet in length web members without mechanical adjustment. A stack of webs is positioned in the web hopper feeder defined by web side members, the web feeder gate, and the web bottom support rails. If the webs are eight feet in length, the second lug is positioned to be slightly upstream from the web trailing edges. Therefore, the tail sprocket is preferably mounted so as to be relocated slightly greater than eight feet from the web feeder gate area. As the second lug is advanced forwardly into contact with the trailing edge of the bottommost web, it advances the bottommost web through the feeder gate and then forwardly for approximately eighteen (18) inches until the leading edge of the advancing web engages a web run-up or speedup roll assembly which is normally located about eighteen (18) inches downstream from the web feeder gate area.

If four (4) foot long webs are being fed through the assembly machine, after the first lug feeds the bottommost web through the web feeder gate and into the web run-up roll assembly, the direction of rotation of the chain assembly is reversed to allow the first lug to reverse direction as the next web of the stack is dropped into the feed position. Then the chain assembly reverses into the opposite downstream direction to feed this next web in order to prevent large gaps between adjacent webs. In the case of eight feet web lengths, however, it is preferred to return the second lug back to its home position without reversely rotating the lug feed chain assembly. However, in either case, the chain assembly is visually both suddenly and violently started and stopped which disadvantageously results in shaking and instability of the assembly machine.

It is accordingly one object of the present invention to feed webs or other wooden members from the bottom of a stack through a feeder gate without sudden starting and stopping of the feed conveyor to thereby prevent shaking and unnecessary vibration and instability.

Another object is to control the feeding forces used to propel the web or other members from beneath the stack in a feed direction.

Another further object is to replace a lugged chain web feed assembly within a chords and webs assembly machine with a vacuum conveyor belt to provide for the smooth feeding flow of webs into the assembly machine.

A production line assembly machine for manufacturing a wooden I-beam from a pair of elongated wooden flange members and planar wooden web members, in accordance with the present invention, comprises a pair of flange chutes mounted to a machine base for conveying an opposing pair of flanges along left and right hand sides of the machine, respectively. A flange infeed drive assembly drives the flanges along the flange chutes. A web conveyor area is disposed between the flange chutes for conveying the web members between the left and right flange pairs. A web drive system drives the webs in end-to-end relationship between the flange chutes. The flange chutes converge towards the machine center line axis to enable the web edges to be respectively inserted into the flange grooves in joined relationship to form the beam. A flange outfeed drive assembly then engages the flanges of the joined beam to convey the same towards the discharge end of the machine.

In accordance with the present invention, the web conveyor area includes a web infeed hopper and a vacuum conveyor belt system upon which a stack of webs is adapted to be disposed behind a web feeder gate. In operation, suction is applied to the lower face of the bottommost web through communicating supply holes formed in the conveyor belt resting on the similarly apertured top surface of a vacuum supply box. The resulting suction is sufficient to adhere the lower face of the bottom web to the upper run of the conveyor for propelling the web through the feeder gate.

In the preferred embodiment, the web conveyor area is defined by a pair of web bottom support rails having upper edges supporting the webs in sliding contact. The support rails are located between the flange chutes. The vacuum conveyor belt system includes a vacuum box mounted to extend between the support rails. Preferably, the vacuum supply box is mounted to the support rails through a series of adjustment screw assemblies that provide for vertical adjustment of the height of the vacuum box relative to the rails. Each screw assembly is individually adjustable so that the inclination of the upper conveyor run, relative to a larger diameter head pulley about which the conveyor belt is trained, may be level or downwardly inclined towards the head pulley to promote better shearing action between the bottommost web member and the remainder of the stack.

The vacuum supply box is preferably formed with a top plate extending between upper edges of a pair of vacuum chamber side plates defining the lateral extent of the chamber. The top plate is preferably in the form of a wear strip having two groups of vacuum supply holes formed in predetermined patterns at longitudinally spaced intervals from each other.

In the preferred embodiment, the aforementioned wear strip supply holes are interconnected in selected longitudinally adjacent pairs through a series of slots that enable suction to be applied through the wear strip to the conveyor belt during periods of non-alignment between the belt supply holes with the wear strip supply holes.

The region between the two groups of wear strip supply holes is preferably a substantially imperforate region, as is the trailing end portion of the wear strip, and both imperforate regions are dimensionally located to be disposed beneath the trailing end portion of web members of certain nominal lengths, respectively, to create areas without suction. For example, in the case of wooden web members of nominal four-foot lengths, the trailing end portions of these web members are adapted to overlie the imperforate region formed between the two groups of vacuum supply holes. This arrangement advantageously minimizes belt wear as the trailing end portion of the next-in-line wooden web member begins to tilt downwardly onto the conveyor belt as the bottom web member travels out from under the stack, due to the absence of suction at this trailing end. In the case of wooden web members of nominal eight-foot length, the trailing end portions of such larger web members are adapted to overlie the imperforate trailing end portion of the wear strip for the same reason.

A method of feeding wooden web members into a chords and web assembly machine utilizing a vacuum conveyor belt system is also disclosed.

It will be further appreciated that the vacuum conveyor system of this invention has separate utility in other types of assembly machines not necessarily used in the manufacture of wooden I-beams but wherein planar wooden members are fed from the bottom of an infeed hopper stack to another location or station.

Still others objects and advantages of the present invention will become readily apparent to those skilled in this art from the following detailed description, wherein only the preferred embodiments of the invention are shown and described, simply by way of illustration of the best mode contemplated of carrying out the invention. As will be realized, the invention is capable of other and different embodiments, and its several details are capable of modification in various obvious respects, all without departing from the invention. Accordingly, the drawing and description are to be regarded as illustrative in nature, and not as restrictive.

BEST MODE FOR CARRYING OUT THE INVENTION

Figure 2:
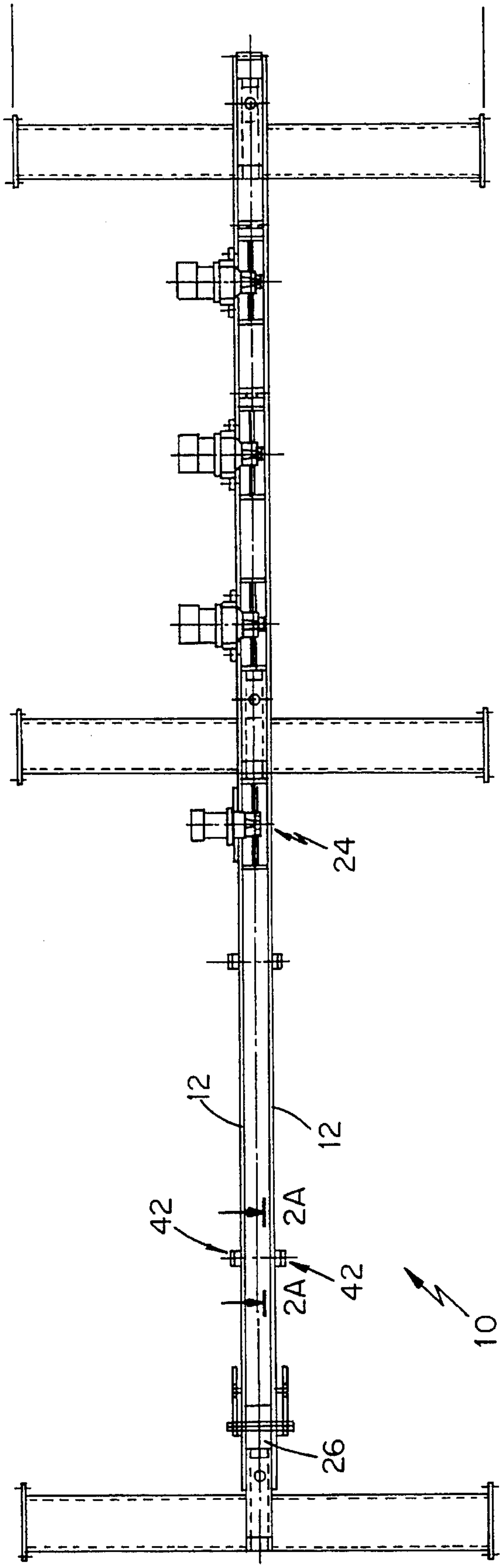
FIG. 2 is a scaled top plan view of the web conveyor area of FIG. 1.
Figure 1:
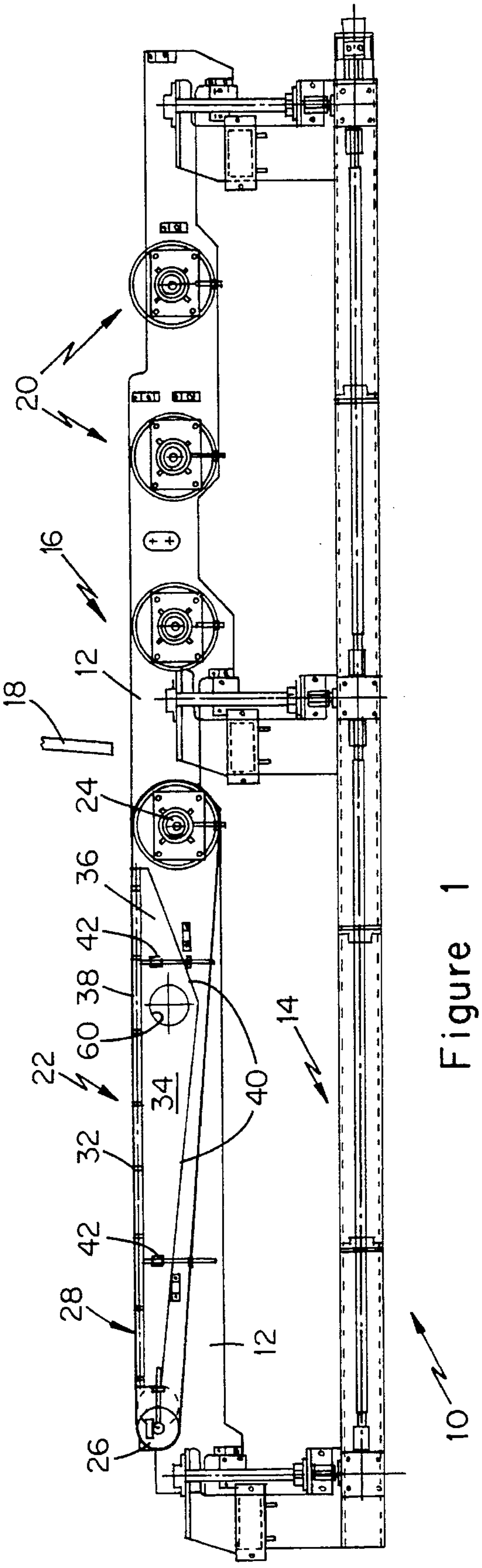
FIG. 1 is a scaled side elevational view of a web supply and conveyor system of a wooden I-beam assembly machine to which the present invention is directed.

FIGS. 1 and 2 are elevational and top plan views, respectively, of a web hopper feed and run-up area 10 within a center section of a chords and webs assembly machine of the type as preferably depicted in the aforesaid '526 co-pending application, the relevant disclosure of which is hereby incorporated by reference herein in its entirety, but particularly with reference to FIGS. 14–16. In pertinent part, a pair of left and right hand web support frames or rails 12 are supported on a machine base 14 and in turn support a web bottom speed-up roll 16 which is located downstream from the web hopper feed gate whose position is identified with reference numeral 18 in FIG. 1. A series of web bottom drive roll assemblies 20 are located downstream from the web bottom speed-up roll 16. The structure and operation of the web hopper feed, and the speed-up and bottom drive rolls 16,20 may be identical to the corresponding structures disclosed in the '526 application, except as noted below.

In replacement of the lugged web chain assembly disclosed in the '526 application, the present invention features a vacuum conveyor belt system 22 comprised of a larger diameter, motor driven head pulley 24 and a smaller diameter tail idler pulley 26 both rotatably mounted to extend between the web support rails 12. A vacuum conveyor belt 28, provided with a predetermined layout of vacuum holes 30 (FIGS. 3 and 4 only), described infra, is trained around the head and tail pulleys 24,26. The upper run 32 of the conveyor belt 28 is supplied with vacuum from a unique vacuum supply chamber 34 disposed between the upper and lower conveyor runs to create a suction force applied to the underside of the bottommost web member (not shown) to advance same through the web feeder gate 18.

Figure 2B:
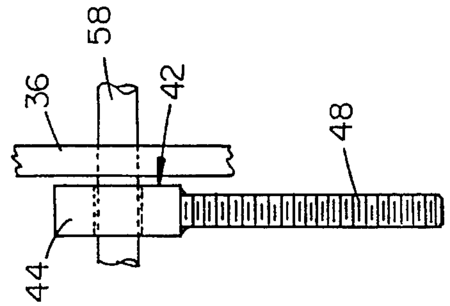
FIGS. 2A and 2B are side and end elevational views, respectively, partly in schematic form, of a screw adjustment mechanism according to the invention, with FIG. 2A taken along the line 2A—2A of FIG. 2.
Figure 2A:
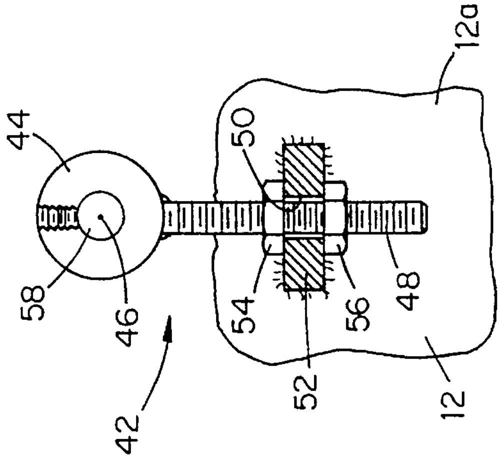

The vacuum box 34 is formed from the pair of vacuum chamber side plates 36 connected along upper edges thereof with a wear strip 38 extending horizontally between the side plates, and with bottom and end members 40 attached to extend between the bottom edges of the side plates to define an enclosed vacuum chamber. The vacuum box 34 is vertically adjustably mounted to and between the web support rails 12 through two pairs of adjustment screw mechanisms 42, respectively located at opposite ends of the vacuum box. More specifically, with particular reference to FIGS. 2A and 2B, each adjustment screw mechanism 42 is comprised of a set collar 44 having a horizontal axis 46 from which depends a vertically extending threaded rod 48 received in an unthreaded vertical opening 50 of a lug 52 formed to project inwardly from the inner vertical surface 12*a* of an associated one of the web support rails 12. A pair of upper and lower adjustment nuts 54 and 56 are secured to each threaded rod 48 to bear against the top and bottom surfaces, respectively, of the associated lug 52 to allow for manual adjustment of the vertical height of the set collar 44. The associated pair of set collars 44 at each end of the vacuum supply box 34 is adapted to receive the opposite ends of a mounting shaft 58 extending through the vacuum chamber sideways to adjustably support the vacuum box relative to the support rails 12. Although not shown in detail, the outermost ends of each mounting shaft 58 and opposite ends of the supply box 34 may extend through elongate vertical slots within an adjacent one of the web support rails 12 permitting unimpeded vertical adjusting travel relative to the rail.

The aforementioned adjustment screw assemblies 42 permit the upstream and downstream ends of the vacuum chamber 34 to adjust the inclination of the upper run 32 of the vacuum belt 28 in the direction of conveyance. For example, the upper run 32 of the conveyor may be adjusted in this manner to have a slight downward inclination in the direction of the web feeder gate 18. This improves bottom web feeding through the gate 18 by providing a better shearing action between the bottom web relative to the remainder of the webs stacked on top. If desired, however, the upper run 32 of the vacuum conveyor belt 28 may be levelled in relation to the crown of the head drive pulley 24, or tilted downwardly in the direction of the tail pulley 26.

One of the vacuum chamber side plates 36 is formed with a vacuum supply hole 60 (FIG. 1) which provides for connection of a vacuum hose (not shown) to a source of vacuum such as a low pressure, high vacuum source.

Figure 3:
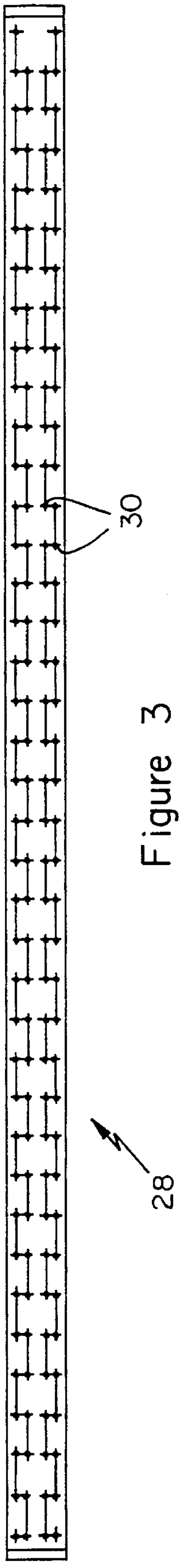
FIG. 3 is a scaled top plan view of a vacuum conveyor belt used in the present invention.
Figure 4:
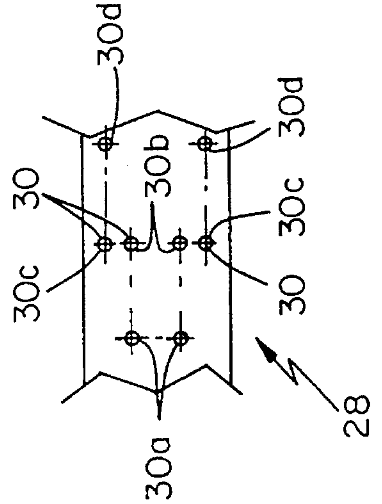
FIG. 4 is an enlarged scaled partial top plan view of a portion of the belt of FIG. 3.

The vacuum conveyor belt 28, with reference to FIGS. 3 and 4, is formed with the plurality of punched vacuum holes 30 along the entire belt width. For reasons discussed infra, a series of four vacuum holes 30 extend across the belt width at longitudinally spaced intervals. The two inner holes 30*a* along each row are respectively associated with a longitudinally adjacent vacuum hole 30*b* of the next adjacent pair of inner holes, while the two outer vacuum holes 30*c* are associated with a longitudinally adjacent outer vacuum hole 30*d* of the next adjacent array. In this manner, the vacuum holes are preferably formed in an alternating sequence of outer 30*c*,30*d* and inner 30*a*,30*b* pairs of vacuum holes along each side of the conveyor belt 28 in the direction of conveyance.

In the preferred embodiment, the conveyor belt 28 is preferably a rubber belt having the system of vacuum holes 30 punched as ⅜" diameter vacuum holes. The longitudinal spacing between the holes 30*a*,30*b* and 30*c*,30*d* is preferably 2". The center line spacing between adjacent outer and inner holes is ½" and the transverse spacing between adjacent inner holes 30*a* is 1" along a belt width of nominally 3". The outer vacuum holes 30*c*,30*d* are spaced approximately ½" from the adjacent belt edge.

The top plate 38 of the vacuum box 34 is preferably a Micarta wear strip bolted to the top edges of the vacuum chamber side plates 36 and is formed with a series of vacuum supply holes 66 (depicted in FIG. 5) that essentially duplicate the hole pattern in the conveyor belt 28 to provide for vacuum alignment during operation. The longitudinally adjacent vacuum holes 66*a*,66*b* in the corresponding pairs are preferably interconnected with a longitudinal slot 68 in the top surface of the wear strip 38 that may nominally be of ¼" width and depth. These connecting slots 68 permit the vacuum supply holes 30 in the conveyor belt 28 to be supplied with suction when there is no direct alignment with the holes 66 in the wear strip 38.

Figure 5:
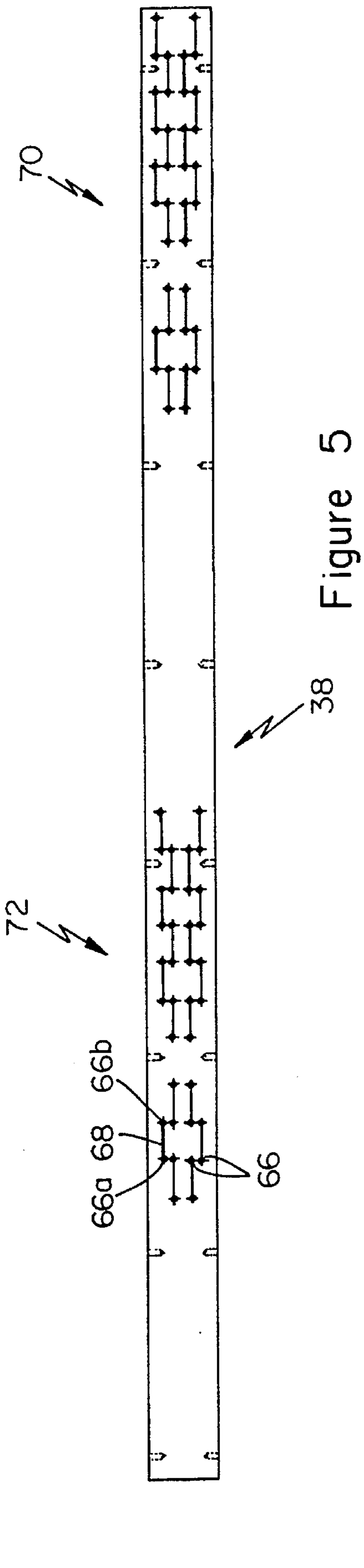
FIG. 5 is a scaled top plan view of a wear strip used in the vacuum supply box of the present invention.

Still with reference to FIG. 5, it will be seen that the pattern of supply holes 66 are not formed continuously along the entire length of the wear strip 38. Instead, in accordance with a unique feature of this invention, two groups of supply holes 70 and 72 are formed at longitudinally spaced locations from each other. The downstream group 70 located adjacent the web feed gate 18 is adapted to apply vacuum directly to the bottom surface of the leading edge of the bottom web member and the spacing between the first and second groups 70,72 enables the trailing end of a four foot length web to be out of vacuum contact with the belt 28. In the case of eight foot web lengths, both the first and second groups 70,72 of vacuum holes 66 will provide suction contact with the bottom web member while the trailing end of the eight foot web will be out of vacuum contact with the belt 28. This feature of applying greater vacuum to the leading edge or front portion of the web with a lesser degree or no vacuum being applied to the trailing and/or rear portion of the web advantageously enables the front portion of the web member to be held down against the conveyor belt 28 under suction force to enable proper feeding of the bottom web through the throat of the web feeder gate 18. As the bottom web begins to feed from beneath the stack, the rear end of the stack will eventually tip down on to the conveyor belt 28. Forming of the wear strip with the unique hole pattern described hereinabove will allow the rear portion of next in-line bottom web member to contact the advancing belt 28 without suction being applied to this rear portion which would otherwise create excessive belt wear since the leading end of this next in line bottom web is restrained by the throat 18 from forward movement until it completely rests on the belt surface.

The foregoing vacuum conveyor belt system 22 may be continuously operated at an appropriate speed to advantageously both control the web feeding speed and obtain smooth web feeding without the associated undesirable shaking and vibration which tended to occur with the reciprocating lugged chain conveyor system disclosed in the '526 system.

In the preferred embodiment, the vacuum conveyor belt 28 is preferably a rough top belt having a high coefficient of friction (e.g., greater than or equal to approximately 0.5). However, it will be understood that the invention is capable of operation with a smooth conveyor belt supplied with vacuum in the manner described above although the rough top conveyor belt is preferred as a result of the greater traction force imparted to the web members.

In certain applications, it may be possible to operate the above-described conveyor system with the rough belt and without application of vacuum.

The use of a rough top conveyor belt in rough contact with the bottom surface of the web tends to result in the generation of particles from the web adhering to the belt surface. However, the feature of placing vacuum holes in the belt advantageously results in a vacuum type of self-cleaning to maintain good traction with minimal down time.

As a further improvement to the chords and webs assembly machine disclosed in the '526 application, the outfeed rolls provided in the flange outfeed drive assembly may be provided with a knurled vertical surface for increased traction and reduced clamping force.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

I claim:

1. A production line assembly machine for manufacturing a wooden I-beam from a pair of elongated wooden flange members each having a longitudinal groove formed in one of the faces of the flange, and planar wooden web members having opposite longitudinal edges, comprising:

(a) a pair of flange chutes mounted to a machine base for conveying an opposite pair of flanges along left and right hand sides of the machine, respectively;

(b) a flange infeed drive assembly for driving said pair of flanges along said flange chutes;

(c) a web conveyor area between the flange chutes for conveying said web members between said left and right hand flanges;

(d) a web drive system for driving said webs in end-to-end relationship between said flange chutes, said flange chutes converging towards a machine center line axis to enable the web edges to be respectively inserted into the converging flange grooves in joined relationship to form the beam; and (e) a flange outfeed drive assembly engaging the flanges of the joined beam to convey same towards a discharge end of the machine;

wherein said web conveyor area includes a web infeed hopper and a vacuum conveyor belt system, upon which a stack of web members is adapted to be disposed in the hopper behind a web feeder gate, for applying suction to a bottom surface of the bottommost web to thereby advance the same through the web feeder gate through the traction force generated by the suction applied through the advancing belt.

2. The production line assembly machine of claim 1, wherein said web conveyor area includes a pair of web bottom support rails located between the chutes, said vacuum conveyor belt system including a vacuum box mounted to extend between the support rails.

3. The production line assembly machine of claim 2, further comprising means for vertically adjusting the height of the vacuum box relative to the support rails.

4. The production line assembly machine of claim 3, wherein said adjusting means includes a plurality of adjustment screw assemblies, each adjustment screw assembly including a threaded adjustment rod portion mounted to one of the vacuum supply box and a web support rail, and an adjustment nut portion, threadedly engaging the adjustment rod and mounted to the other of the vacuum supply box and the support rail to provide for relative adjusting movement.

5. The production line assembly machine of claim 2, wherein said vacuum supply box includes a top plate on which is disposed an upper run of the conveyor belt, a series of vacuum supply holes being formed in each of the top plate and conveyor belt to apply suction against the lower surface of the bottommost web member.

6. The production line assembly machine of claim 6, wherein selected ones of the vacuum supply holes in the top plate are interconnected to each other through a slot which permits vacuum to be continuously supplied to the conveyor belt when the conveyor vacuum holes are out of alignment with the top plate vacuum holes.

7. The production line assembly machine of claim 6, wherein said vacuum supply holes in the top plate are arranged to provide a greater amount of suction force against a leading end of the bottommost web member.

8. The production line assembly machine of claim 7, wherein two groups of vacuum supply holes are formed in the top plate in longitudinally spaced relation to each other.

9. The production line assembly machine of claim 8, wherein the two groups of vacuum supply holes are spaced a sufficient distance from each other such that a trailing end portion of a web member of predetermined nominal length is adapted to be disposed, in the feeding position within the stack, between said first and second groups such that little or no suction is supplied to said trailing end portion.

10. The production line assembly machine of claim 8, wherein said top plate includes an imperforate region formed in a trailing end portion of said top plate upstream from the said two groups of vacuum supply holes, and wherein the trailing end portion of web members of a second predetermined nominal length are adapted to be juxtaposed over this imperforate section in the feeding position.

11. The production line assembly machine of claim 1, wherein vacuum is supplied to the vacuum conveyor belt system through a low pressure, high volume source of vacuum.

12. The production line assembly machine of claim 11, wherein said source of vacuum is plant vacuum.

13. In a machine for manufacturing wooden products which are formed in part with planar wooden members, the improvement comprising a planar wooden member infeed hopper and a vacuum conveyor belt system upon which a stack of said planar wooden members is adapted to be disposed behind a planar wooden web member feeder gate for sequential feeding from the bottom of the stack through the gate.

14. A method of manufacturing a wooden I-beam from a pair of elongated wooden flange members each having a longitudinal groove formed in one of the faces of the flange, and planar wooden web members having opposite longitudinal edges, comprising the steps of conveying an opposing pair of said flanges along left and right hand flange chutes within the machine utilizing a plurality of infeed flange drive rolls; conveying a plurality of web members between said flange chutes in end-to-end relationship with a plurality of top and bottom web drive rolls; said left and right hand flanges being gradually converged to enable the web edges to be respectively inserted into the flange grooves in joined relationship to form the beam; conveying the joined beam towards a discharge end of the said machine with a plurality of flange outfeed drive rolls, wherein the step of conveying said web members between said flange chutes includes the additional step of sequentially feeding said web members into the top and bottom web drive rolls from a web infeed hopper having a web feeder gate behind which the said web members are stacked, by engaging the lower surface of a bottommost web member with a vacuum conveyor belt to create suction which is applied to advance said web member beneath said feeder gate.

* * * * *